April 14, 1964  F. L. PALM  3,128,984
CONTAINER HOLDER AND BLANK
Filed Feb. 6, 1962
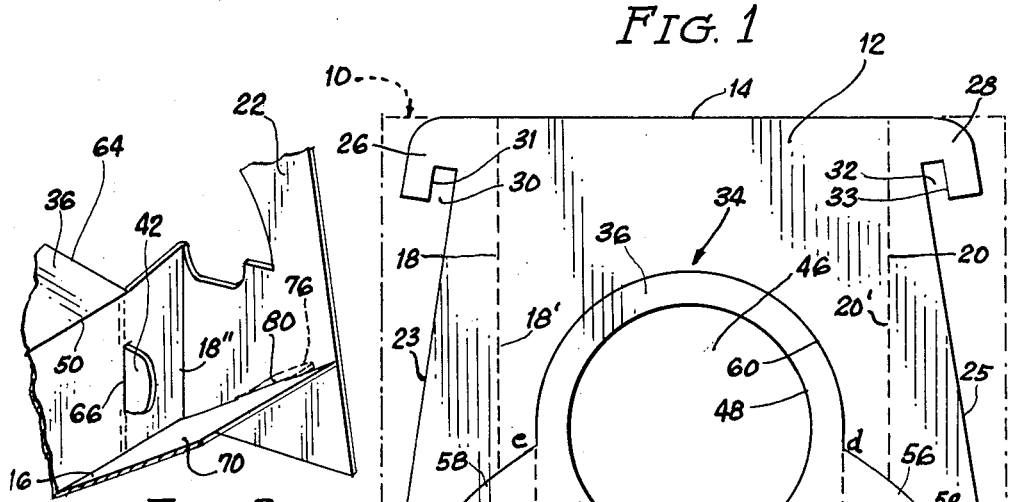
FIG. 1
FIG. 3
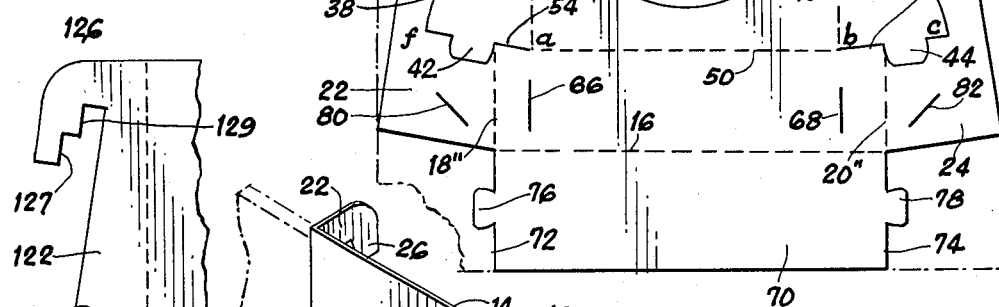
FIG. 4
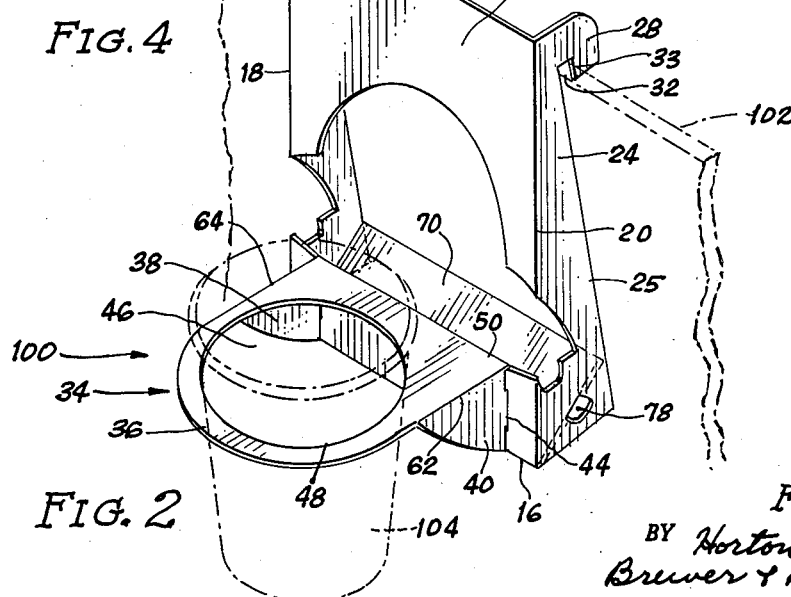
FIG. 2
INVENTOR.
Felix L. Palm
BY Horton, Davis,
Brewer & Brugman
Att'ys

United States Patent Office 3,128,984
Patented Apr. 14, 1964

3,128,984
CONTAINER HOLDER AND BLANK
Felix L. Palm, 2241 W. Greenleaf Ave., Chicago, Ill.
Filed Feb. 6, 1962, Ser. No. 171,463
10 Claims. (Cl. 248—311)

The problem of where to put containers of beverages while eating in automobiles or while driving on the highways confronts millions of motorists and automobile passengers each year. Even after places for the containers have been found, it is impossible for such persons to enjoy fully whatever else they may be doing because of continuing forebodings that inadvertent moves might cause the cup to slide off the dashboard, the glass to overturn on the seat, or the container to tip over on the floor. The number of stains on automobile upholstery caused by spilled milk shakes, overturned cups of coffee and carbonated beverages, among others, bears mute testimony to those fully justified fears.

The question of where to put such containers arises in many situations. For example, take the family with several youngsters which has motored to the local drive-in restaurant for hamburgers and shakes. The order is delivered to the automobile on a tray, which tray is normally placed upon a swingable supporting member outside of the automobile adjacent one of the front seats. Either each member of the family uses that support, an inconvenient and uncomfortable alternative, or the containers of beverages are precariously balanced in various locations. Especially with younger children, the parents must hold the containers or keep a constant vigil. In either event it is difficult for the parents to relax and enjoy their own food.

Another situation in which the problem confronts the motorist occurs when he is driving along and wishes to save part of a cup of coffee or such for a few miles down the road. Usually that means he must hold the cup while he is driving, an unsafe and an undesirable solution, or he must balance it on the seat or floor where it might spill, a possibility of which he is constantly aware and a possibility frequently realized.

While those situations, as well as countless others which are readily apparent, could be avoided by refraining from drinking liquids in automobiles, the attendant dilemmas can be avoided more pleasantly in accordance with the teachings of this invention.

This invention relates to container holders, particularly cup and glass holders and blanks from which they may be formed and shaped.

One of the primary objects of this invention is to provide a novel cup or glass holder which may be formed from a single sheet of material and which is inexpensive and disposable.

It is a further object of this invention to provide a novel cup and glass holder which is especially adapted for use in autombiles and other vehicles having windows from which the cup and glass holder may be hung.

It is yet another object of this invention to disclose a cup and glass holder which has large areas thereof available for advertising or other desired printed material.

Another object contemplated by this invention is the provision of a cup and glass holder which may be formed from cartons such as cereal boxes or carriers such as soda pop bottle carriers in accordance with instructions to be placed thereupon.

Another object within the purview of this invention is the provision of a novel cup and glass holder which is formable from a relatively stiff but flexible material, which material is rendered substantially less flexible by certain other portions thereof.

A second principal object of this invention is to provide a blank made of a relatively stiff but flexible material, which blank is formable and shapeable into a container holder.

Further objects of this invention are to provide blanks of relatively stiff but flexible material such as cardboard, which blanks are scored for cutting and folding and are shapeable into container holders, as well as cup holders formable from blanks wherein a minimum amount of material is used.

The invention described herein relates to blanks and container holders such as cup or glass holders formable therefrom having a wide variety of potential commercial uses. At least one of such areas of use is at drive-in restaurants and movies. Since the container holders can be manufactured very inexpensively, especially if made from cardboard, and are as disposable as are paper plates, they can be given to customers when sales of beverages are made. They can be given as formed cup holders or they may be given the customer in the form of blanks to be shaped by the customer himself. The value of such devices as "give away" items is enhanced by the large areas available on them for the placement of advertising and other printed material. That material may be positioned so that it will be exposed to the view of the user when the holder is being used.

Distribution of the blanks and holders of this invention is not limited to drive-in restaurants and movies. It is contemplated that the blanks may be impressed or imprinted upon cereal boxes, carbonated beverage carriers and the like, for example as a part of promotional schemes.

Cup holders, or preferably the blanks from which they may be formed, may also be sold singly or in packages, for example as picnic utensils. Since they are especially useful when eating in cars, many famililies will find it convenient to take one or more along with the picnic dinner for use in case circumstances require the family to eat in or at the automobile.

Many other objects and advantages of the devices of this invention are immediately apparent. Still more will become apparent from the following description and drawings of which:

FIGURE 1 is a plan view of a flat blank from which a cup holder of this invention may be formed;

FIG. 2 illustrates in perspective the cup holder formable from the blank of FIG. 1;

FIG. 3 is a perspective view of a portion of the rear of the cup holder of FIG. 2; and FIG. 4 is a plan view of an alternative hook structure which may be incorporated in the blank and tray of FIGS. 1 and 2.

FIGURE 1 shows a blank 10 made of any relatively stiff but somewhat flexible material, such as moderately heavy cardboard. Blank 10 is adapted to be folded and shaped into a cup or glass holder in a manner to be described. Blank 10 includes a main body portion 12 having an upper edge 14, a lower edge 16 and two side edges 18 and 20. Adjacent each of the two side edges 18 and 20 are tapered ribs 22 and 24. Tapered ribs 22 and 24 are generally trapezoidal in shape and include side edges 23 and 25 respectively. The ribs 22 and 24 terminate adjacent their uppermost edges in hooks 26 and 28 which define cut-out portions 30 and 32. The cut-out portions include parallel spaced edges 23, 31 and 25, 33 respectively.

Coinciding with side edges 18 and 20 of main body portion 12 are lines scored for folding. Said lines scored for folding are discontinuous said include upper portions 18' and 20', and lower portions 18" and 20" respectively.

When used herein, the term "lines scored for cutting" contemplates lines marked or inscribed for cutting, lines partially severed and lines which are completely cut. The phrase "a line scored for folding" envisions a line marked or inscribed for folding as well as a line which has been physically scored to facilitate folding.

As shown in FIGURE 1, certain parts of main body portion 12 and tapered ribs 22 and 24 define a cup holding structure 34. The cup holding structure 34 includes a cup receptacle element 36, struts 38 and 40 and tongues 42 and 44. Cup receptacle element 36 includes a substantially circular aperture 46 which is circumscribed by a line 48 scored for cutting.

Cup holding structure 34 is completely circumscribed by lines scored for cutting and lines scored for folding. To facilitate an understanding of the cut and fold lines, certain points along the periphery of the cup supporting structure have been designated by the letters *a* through *f* inclusive.

Beginning at point *a* and terminating at point *b* there is provided a line 50 scored for folding. An irregular line 52 starting at point *b* and terminating at point *c* and defining a tongue 44 is scored for cutting. Similarly line 54 which etxends from point *f* to point *a* is scored for cutting. Lines 56 and 58, slightly curved lines extending from *c* to *d* and *e* to *f* respectively, are scored for cutting. Line 60 which starts at point *d* and terminates at point *e*, a generally semi-circular line substantially parallel to aperture defining line 48, is scored for cutting. Finally, lines 62 and 64 extending between points *b* and *d* and points *a* and *e*, respectively, are scored for folding.

Below the line 50, the main body portion 12 bears two slot lines 66 and 68 scored for cutting. Slot lines 66 and 68 are positioned in main body 12 with respect to cup holding structure 34 so that they will matingly receive tongues 42 and 44 in a manner to be described.

Optionally a part of blank 10 is reinforcing element 70 connected to main body portion 12 along lower edge 16, a line scored for folding. Reinforcing element 70 is circumscribed in part by lines 72 and 74, lines scored for cutting. Lines 72 and 74 define tongues 76 and 78 respectively. Positioned in tapered ribs 22 and 24 are rib slot lines 80 and 82 respectively, lines scored for cutting, positioned to matingly receive tongues 76 and 78.

The blank of this invention may be supplied and distributed in various forms, the embodiment selected in any given situation depending in large measure upon the particular customer's desires.

If a blank made in accordance with the teachings of this invention is distributed as part of a carton, carrier or the like, the lines which have been described as scored for cutting may be merely inscribed as lines to be cut, or may be partially severed in any conventional manner. Similarly, the lines scored for folding in such instances may be marked or inscribed as fold lines or, alternatively, may be physically creased or impressed.

If they are to be distributed as primary products, the blanks of this invention may be entirely pre-cut, having all or some of the waste portions to be removed already removed. Removal of the waste portions prior to distribution reduces shipping weights and shipping costs. If desired, the optional reinforcing element 70 may be supplied with the main blank portion.

Regardless of the manner in which the blanks of this invention are supplied to the user, certain portions, if present, must be removed. Those portions include all of the excess portions of blank 10 surrounding main body portion 12 and rib portions 22 and 24, the material filling cut-out portions 30 and 32 of hooks 26 and 28 and the material circumscribed by line 48.

To shape the container holder of FIGS. 2 and 3 form the blank of FIG. 1 certain steps must be taken. After the waste portions have been discarded, all of the lines scored for cutting not already completely severed must be cut. Those lines include the lines 52, 54, 56, 58 and 60 partially circumscribing cup holding structure 34, tongue receiving slot lines 66 and 68 and, if optional reinforcing member 70 is to be used, lines 72 and 74 and slit lines 80 and 82. When the cutting is completed, the elements adjacent the various lines scored for folding may be folded along those lines in the following manner.

Ribs 22 and 24 are folded rearwardly of the plane of main body portion 12 along line segments 18', 18" and 20' and 20" until they are self-maintaining in positions generally parallel to each other and normal to main body portion 12. Struts 38 and 40 are then folded forwardly of the plane of main body portion 12 along lines 62 and 64 until they are generally parallel to each other and normal to cup receptacle element 36. Finally cup holding structure 34 is folded downwardly and forwardly of the plane of main body portion 12 along line 50 until tongues 42 and 44 of struts 38 and 40 fully enter slots 66 and 68. At that time the portions of lines 52 and 54 above and below tongues 42 and 44 abut against portions of main body portion 12 immediately above and below slots 66 and 68.

Referring now to FIGS. 2 and 3, there is shown a cup holder 100 constructed in accordance with the teachings of this invention. It is formable and shapeable from the blank described and illustrated in FIG. 1.

Cup holder 100 includes a main body portion 12 and rib portions 22 and 24 integral with and hingedly connected to the side edges 18 and 20 of main body portion 12. Rib portions 22 and 24 terminate at their upper ends in hooks 26 and 28 having cut-out portions 30 and 32. Hooks 26 and 28 are adapted to support cup holder 100 from a relatively vertical member such as window 102 of an automobile. The cut-out portions 30 and 32 are dimensioned so that the distances between the front and rear parallel inside edges 23, 31 and 25, 33 respectively, are substantially the same as the thickness of the window 102. It is apparent that such a dimensional relationship causes ribs 22 and 24 to be positioned substantially normal to window 102 and to main body portion 12.

Disposed forwardly of the plane in which main body portion 12 lies is cup holding structure 34 hingedly attached thereto along a fold line 50. Structure 34 includes a cup receptacle element 36 having a suitably dimensioned cup or glass receiving aperture 46 therein. Depending struts 38 and 40 are hingedly attached to the cup receptacle element 36 along fold lines 62 and 64 and are disposed generally parallel to each other and substantially normal to both receptacle element 36 and main body portion 12. The tongues 42 and 44 lie within slots 66 and 68 and protrude rearwardly of the plane of main body portion 12, thereby positively maintaining the relationship of certain of the parts shown in FIG. 2.

Since the material from which the cup holder disclosed herein may be made is a moderately flexible material such as cardboard, it is obvious that reinforcing elements are necessary to rigidify and stabilize the cup receptacle element. The reinforcing means contemplated by this invention include struts 38 and 40, ribs 22 and 24, and, optionally, member 70.

When cup 104 resides within aperture 46, the cup supporting structure 34 tends to swing downwardly along line 50. That tendency is resisted by struts 38 and 40 which are positively maintained in the substantially parallel vertical positions shown in FIG. 2 by tongues 42 and 44 and cooperating slots 66 and 68. Although it is not essential that the struts be disposed absolutely vertically, obviously their most effective orientation is a vertical one.

As shown, struts 38 and 40 extend forwardly of main body portion 12, meeting cup receptacle element 36 along lines 62 and 64. The farther forward struts 38 and 40 extend (the greater the length of lines 62 and 64), the greater the load cup supporting structure 34 may carry, since the struts tend more strongly to stabilize and support cup receptacle element in a substantially horizontal plane. In addition, the greater the length of struts 38 and 40, the more resistant the cup receptacle element 36 is to flexing and bending along lines generally parallel to a straight line extending between points *d* and *e* (FIG. 1).

Thus struts 38 and 40 both stabilize the cup receptacle element in a generally horizontal plane, and rigidify and reinforce it.

Ribs 22 and 24 serve two important functions, the first of which is a reinforcing function. It is apparent that the relatively flexible main body portion 12 is prone to folding and bending along lines generally parallel to its upper and lower edges 14 and 16 when a load is applied to the cup supporting structure at a point forward of the plane of main body portion 12. When they are positioned generally normal to the plane of main body portion 12, ribs 22 and 24 resist the effects of such loading, hence reinforce main body portion 12. Although they need not be exactly normal to main body portion 12 or parallel to each other to function satisfactorily, it is apparent that ribs 22 and 24 are most effective when so positioned.

Hooks 26 and 28 and, optionally, reinforcing element 70, assist in maintaining the reinforcing relationship of ribs 22 and 24 to main body portion 12. Hooks 26 and 28 have cut-out portions 30 and 32, which, as previously described, are dimensioned so that the widths of the cut-out portions are substantially the same as the width of the window upon which the cup holder is to be hung. Such proportioning induces hooks 26 and 28, and ribs 22 and 24 with which they are integral, to remain generally normal to window 102. The optional structural member 70, shown in FIGS. 1 and 2, has spaced tongues 76 and 78 adapted to be received by rib slot lines 80 and 82 of ribs 22 and 24, as shown, thus stabilizing ribs 22 and 24 and resisting the tendency of said ribs to spread. To implement the retention of tongues 76 and 78 by rib slots 80 and 82, the tongues may be twisted slightly after their insertion.

The second important function attributable to ribs 22 and 24 is that of orienting the plane of main body portion 12 with respect to the plane of window 102. Assisting in this are the rearwardly disposed edges 23 and 25 of ribs 22 and 24 which rest against the window 102.

Since most automobiles today have windows which slope inwardly towards the top of the car to orient main body portion 12 in a substantially vertical position, the lower portion of main body portion 12 must be more distantly spaced from window 102 than the upper portion. The shapes of the ribs 22 and 24 in large measure compensate for the inward inclination of such windows by inclining the plane of main body portion 12 sufficiently with respect to the plane of the window so that the main body portion 12 is generally vertically disposed. Since the inward inclinations of the windows of automobiles vary, it is impossible to secure completely accurate compensation for all windows with which the cup holder will be used. However, tapered ribs 22 and 24 can be suitably designed to compensate for an average inclination.

The hooks by which the container holder of this invention may be hung from windows may include several notches of different widths. Thus, as seen in FIG. 4, hook 126 which is integral with tapered rib 122 may include a wide notch 127 and a narrow notch 129. The wide notch 127 will accommodate thicker windows and those having metal bands along the upper edges and the narrow notch 129 will accommodate narrower windows.

While substantial variations may be made in the specific embodiments described herein without departing from the scope of this invention, several features or their equivalents must be present to insure the accomplishment of the purposes and objects contemplated. Since the materials intended to be used in the practice of this invention, such as cardboard, are somewhat flexible, certain elements of the container holder must be reinforced or stabilized to prevent flexing or bending. Therefore, some longitudinal reinforcement must be provided for main body portion 12, which, to be most effective, should be disposed generally parallel to edges 18 and 20. Similarly, some reinforcement must be provided to stabilize cup holder receptacle 36 in the generally horizontal position of FIG. 2. The reinforcement elements may take the form of integral members such as ribs 22 and 24 and struts 38 and 40 or other equivalent means.

It is apparent that the inexpensive disposable blank and cup holder described herein have a multitude of advantages and uses and may be constructed in varying manners. Therefore, I intend the scope of the invention herein disclosed to be limited only by the claims appended hereto.

I claim:

1. A device for supporting a container, said device being formable from flat relatively flexible sheet material, comprising: a body including a body portion and integral first reinforcing means hingedly connected to said body portion for rigidifying said body portion, an aperture defined by said body from which a holder element has been struck out, a holder element integral with said body and hingedly connected thereto along a line coincident with at least a portion of the periphery of said aperture, said holder element being generally perpendicularly disposed with respect to said body portion, second reinforcing means operatively engaging said body and said holder element for maintaining the perpendicularity of said body portion and said holder element, and means connected to said body for suspending said body from independent support means.

2. The device defined by claim 1 wherein said second reinforcing means comprises at least two reinforcing elements hingedly connected to and integral with said holder element.

3. The device defined by claim 2 wherein said body portion defines slots and said reinforcing elements include tongues matingly receivable in said slots.

4. The device defined by claim 1 wherein said supporting means comprise hook elements integral with said first reinforcing means.

5. The device defined by claim 4 wherein said hook elements include notch portions of at least two different widths.

6. The device of claim 1 further characterized by a third reinforcing means for stabilizing said first reinforcing means.

7. A disposable cup holder formable from relatively flat flexible sheet material comprising a body portion having upper, lower and side edges, ribs integral with and hingedly adjoining said body portion at each side edge, a hook integral with each of said ribs for hanging said cup holder, a cup holding structure comprising a cup receptacle element integral with and hingedly adjoining said body portion adjacent the lower edge thereof, struts integral with and hingedly adjoining said cup receptacle element, and a tongue integral with each strut, and slots defined by said body portion adjacent the lower edge thereof positioned to matingly receive said tongues, whereby said cup receptacle element is rigidified and is stabilizable in a generally horizontal position in use.

8. The cup holder of claim 7 further characterized by an element engaging said ribs for stabilizing said ribs.

9. A blank made of a relatively flat flexible material and shapeable into a container holder comprising a body portion, first reinforcing means connected to said body portion and disposable at an angle thereto for reinforcing said body portion, supporting means connected to said blank to suspend said container holder from independent support means, and a container supporting structure connected to said body portion lying within the area circumscribed by said body portion and said first reinforcing means and disposable generally normal to the plane of said body portion, said container supporting structure including a container supporting element, and second reinforcing means connected to said blank and disposable at an angle to said container supporting element for reinforcing said container supporting element.

10. A blank made of a flat bendable material and shapeable into a container holder comprising a body portion, first reinforcing means connected to said body portion and disposable at an angle thereto for reinforcing said body portion, supporting means to suspend said container holder from independent support means connected to said first reinforcing means, and a container supporting structure connected to said body portion lying within the area circumscribed by said body portion and said first reinforcing means and disposable generally normal to the plane of said body portion, said container supporting structure including a container supporting element and second reinforcing means connected to said container supporting element disposable at angles to said body portion and to said container supporting element for stabilizing said container supporting element in a position generally normal to said body portion.

References Cited in the file of this patent

UNITED STATES PATENTS

| | | |
|---|---|---|
| 712,824 | Masland | Nov. 4, 1902 |
| 921,704 | Hubbard | May 18, 1909 |
| 1,270,718 | Ford | June 25, 1918 |
| 2,597,731 | Hoy | May 20, 1952 |
| 2,770,513 | Brown | Nov. 13, 1956 |
| 3,031,162 | Whorton | Apr. 24, 1962 |